(12) United States Patent
Tang et al.

(10) Patent No.: US 12,488,029 B2
(45) Date of Patent: Dec. 2, 2025

(54) GRAPH STRUCTURE DATA PROCESSING METHOD AND STORAGE ENGINE FOR GRAPH STRUCTURE DATA

(71) Applicant: Alipay (Hangzhou) Information Technology Co., Ltd., Zhejiang (CN)

(72) Inventors: Zhenhao Tang, Zhejiang (CN); Zhaogui Xu, Zhejiang (CN); Zelin Zhao, Zhejiang (CN); Yongchao Li, Zhejiang (CN); Peng Di, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/972,299

(22) Filed: Dec. 6, 2024

(65) Prior Publication Data

US 2025/0103623 A1 Mar. 27, 2025

Related U.S. Application Data

(63) Continuation of application No. PCT/CN2023/115125, filed on Aug. 27, 2023.

(30) Foreign Application Priority Data

Dec. 29, 2022 (CN) .......................... 202211711471.4

(51) Int. Cl.
*G06F 16/332* (2025.01)
*G06F 16/23* (2019.01)

(52) U.S. Cl.
CPC .......... *G06F 16/3328* (2019.01); *G06F 16/23* (2019.01)

(58) Field of Classification Search
CPC .... G06F 16/3328; G06F 16/23; G06F 16/219; G06F 16/22; G06F 16/901; G06F 16/9024; Y02D 10/00
See application file for complete search history.

(56) References Cited

U.S. PATENT DOCUMENTS 9,576,071 B2 * 2/2017 Metreveli ............... G06F 16/22
2007/0143752 A1 * 6/2007 Clemm .................... G06F 8/71
717/178

(Continued)

FOREIGN PATENT DOCUMENTS

CN 103377289 A 10/2013
CN 104657170 A 5/2015

(Continued)

OTHER PUBLICATIONS

Youshan Miao, "Storage and Analysis Systems for Large-Scale Time-Evolving Graphs," University of Science and Technology of China, 2015, 111 pages.

(Continued)

*Primary Examiner* — Jared M Bibbee
(74) *Attorney, Agent, or Firm* — Seed IP Law Group LLP

(57) ABSTRACT

Implementations of the present specification disclose a graph structure data processing method and a storage engine and device for graph structure data. The method can be implemented by using the storage engine for graph structure data, and includes: receiving a storage request for first data of a target graph, the storage request including a graph identifier of the target graph and the first data; obtaining historical data of the target graph corresponding to the graph identifier from a storage component based on the graph identifier; determining target data that corresponds to a change of the first data of the target graph relative to the historical data, and generating version information corresponding to the target data, the target data including data of a node in the first data of the target graph and/or data of an edge in the first data of the target graph; and mapping a node and/or an edge associated with the target data in the target graph, and storing the target data in the storage component with reference to the version information.

20 Claims, 5 Drawing Sheets

(56) References Cited

U.S. PATENT DOCUMENTS

| | | | | |
|---|---|---|---|---|
| 2017/0103143 | A1* | 4/2017 | Kumar | G06F 16/9024 |
| 2018/0144061 | A1* | 5/2018 | Rodriguez | G06F 16/9024 |
| 2020/0409931 | A1* | 12/2020 | Zang | G06F 16/2365 |
| 2021/0026894 | A1* | 1/2021 | Yang | G06F 16/9024 |
| 2022/0147009 | A1* | 5/2022 | Cooley | G06F 16/9024 |
| 2024/0004871 | A1* | 1/2024 | Jones | G06N 20/00 |

FOREIGN PATENT DOCUMENTS

| | | |
|---|---|---|
| CN | 112000848 A | 11/2020 |
| CN | 112433986 A | 3/2021 |
| CN | 113157981 A | 7/2021 |
| CN | 113220822 A | 8/2021 |
| CN | 113610661 A | 11/2021 |
| CN | 113633981 A | 11/2021 |
| CN | 113849579 A | 12/2021 |
| CN | 114385833 A | 4/2022 |
| CN | 114840539 A | 8/2022 |
| CN | 115391378 A | 11/2022 |
| CN | 115391609 A | 11/2022 |
| CN | 115905266 A | 4/2023 |
| KR | 20190127076 A | 11/2019 |
| KR | 102054070 B1 | 12/2019 |
| WO | 2024139310 A1 | 7/2024 |

OTHER PUBLICATIONS

Zhang et al., "Relief Map Database Updating with Incremental Mode," Beijing Surveying and Mapping, 2007, 4 pages.
Zhang et al., "Research on Navigation Electronic Map Data Increment Updating," Geographic Information World, 2011, 4 pages.

* cited by examiner

GRAPH STRUCTURE DATA PROCESSING METHOD AND STORAGE ENGINE FOR GRAPH STRUCTURE DATA

TECHNICAL FIELD

The present specification relates to the field of computer technologies, and in particular, to a graph structure data processing method and a storage engine and device for graph structure data, especially a storage engine that can be used for graph structure data and a graph structure data processing method implemented by using the storage engine.

BACKGROUND

Graphs are data structures that can be used to represent data of relatively complex topology structures. The graphs are widely applied, and can represent topology structures inside large-scale microservice applications. In daily life, the graphs are unconsciously used.

There are the following characteristics in computation and storage of the graphs: Computation of the graphs may be very time-consuming. For example, computing the k-shortest paths between any two points in relatively large maps is usually very time-consuming. In addition, the graphs are often prone to change. For example, some points and edges are often added or modified in maps. Furthermore, use of the graphs sometimes requires tracing back to previous versions. For example, change analysis performed because of version iteration of microservices requires comparison between two versions of the graphs. These characteristics bring some difficulty to use of the graphs. Particularly, a large amount of repeated computation and storage is caused due to active nature of the graphs. Although optimization can be performed for specific scenarios, the above manner cannot provide a sufficiently general solution for use of the graphs.

SUMMARY

Implementations of the present specification provide a representation manner that supports incremental storage of historical information of graphs, which, among others, greatly reduces overheads of a storage engine for computation and storage of the graphs, so as to improve availability and ease of use of the graphs in microservices and other aspects.

An implementation of the present specification provides a graph structure data processing method. The method includes: receiving a storage request for first data of a target graph, the storage request including a graph identifier of the target graph and the first data; obtaining historical data of the target graph corresponding to the graph identifier from a storage component based on the graph identifier, determining target data that corresponds to a change of the first data of the target graph relative to the historical data, and generating version information corresponding to the target data, the target data including data of a node in the first data of the target graph and/or data of an edge in the first data of the target graph; and mapping a node and/or an edge associated with the target data in the target graph, and storing the target data in the storage component with reference to the version information.

An implementation of the present specification provides a storage engine for graph structure data. The storage engine includes: a storage request module, configured to receive a storage request for first data of a target graph, the storage request including a graph identifier of the target graph and the first data; a graph data processing module, configured to: obtain historical data of the target graph corresponding to the graph identifier from a storage component based on the graph identifier, determine target data that corresponds to a change of the first data of the target graph relative to the historical data, and generate version information corresponding to the target data, the target data including data of a node in the first data of the target graph and/or data of an edge in the first data of the target graph; and a graph data storage module, configured to: map a node and/or an edge associated with the target data in the target graph, and store the target data in the storage component with reference to the version information.

An implementation of the present specification provides a storage device for graph structure data. The storage device for graph structure data includes: a storage engine for graph structure data; and a storage, configured to store computer-executable instructions. When the executable instructions are executed, the storage engine for graph structure data is enabled to perform the following operations: receiving a storage request for first data of a target graph, the storage request including a graph identifier of the target graph and the first data; obtaining historical data of the target graph corresponding to the graph identifier from a storage component based on the graph identifier, determining target data that corresponds to a change of the first data of the target graph relative to the historical data, and generating version information corresponding to the target data, the target data including data of a node in the first data of the target graph and/or data of an edge in the first data of the target graph; and mapping a node and/or an edge associated with the target data in the target graph, and storing the target data in the storage component with reference to the version information.

An implementation of the present specification further provides a storage medium. The storage medium is configured to store computer-executable instructions, and when the executable instructions are executed, a storage engine for graph structure data correspondingly is capable of implementing the following procedure: receiving a storage request for first data of a target graph, the storage request including a graph identifier of the target graph and the first data; obtaining historical data of the target graph corresponding to the graph identifier from a storage component based on the graph identifier, determining target data that corresponds to a change of the first data of the target graph relative to the historical data, and generating version information corresponding to the target data, the target data including data of a node in the first data of the target graph and/or data of an edge in the first data of the target graph; and mapping a node and/or an edge associated with the target data in the target graph, and storing the target data in the storage component with reference to the version information.

BRIEF DESCRIPTION OF DRAWINGS

To describe the technical solutions in the implementations of the present specification more clearly, the following briefly describes the accompanying drawings needed for describing the implementations. Clearly, the accompanying drawings in the following description show merely some implementations of the present specification, and a person of ordinary skill in the art can still derive other drawings from these accompanying drawings without making innovative efforts.

DESCRIPTION OF IMPLEMENTATIONS

Implementations of the present specification provide a graph structure data processing method and a storage engine and device for graph structure data.

To enable a person skilled in the art to better understand the technical solutions in the present specification, the following clearly and comprehensively describes the technical solutions in the implementations of the present specification with reference to the accompanying drawings in the implementations of the present specification. Clearly, the described implementations are merely some rather than all of the implementations of the present specification. All other implementations obtained by a person of ordinary skill in the art based on the implementations of the present specification without making innovative efforts shall fall within the protection scope of the present specification.

Figure 1A:
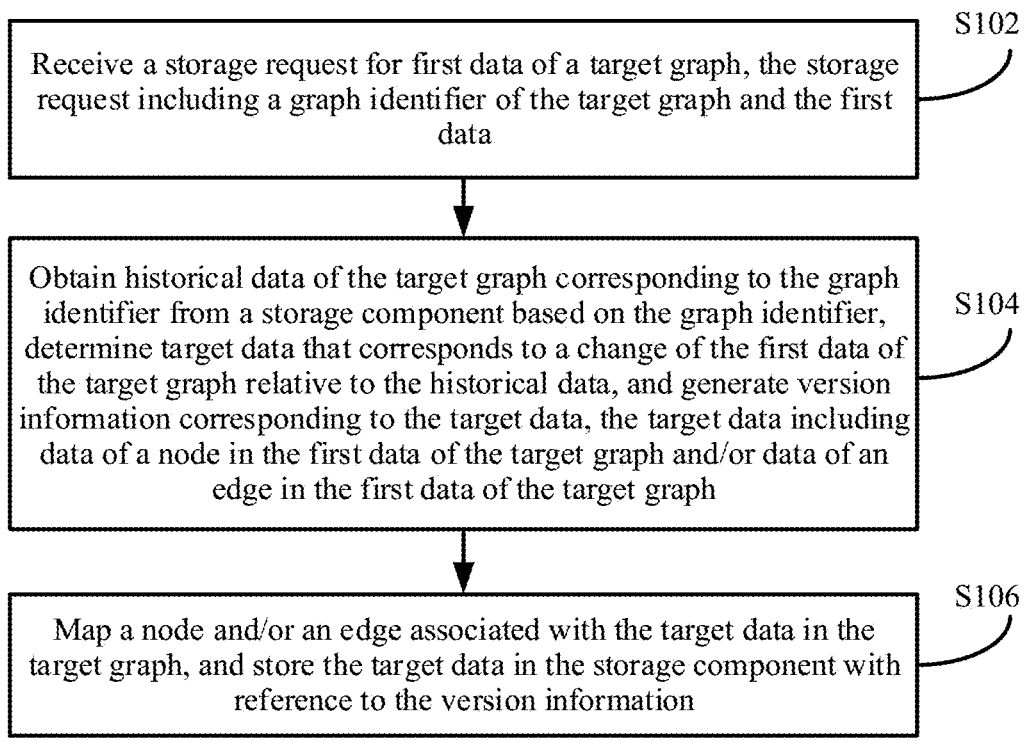
FIG. 1A shows an implementation illustrating a graph structure data processing method according to the present specification.
Figure 1B:
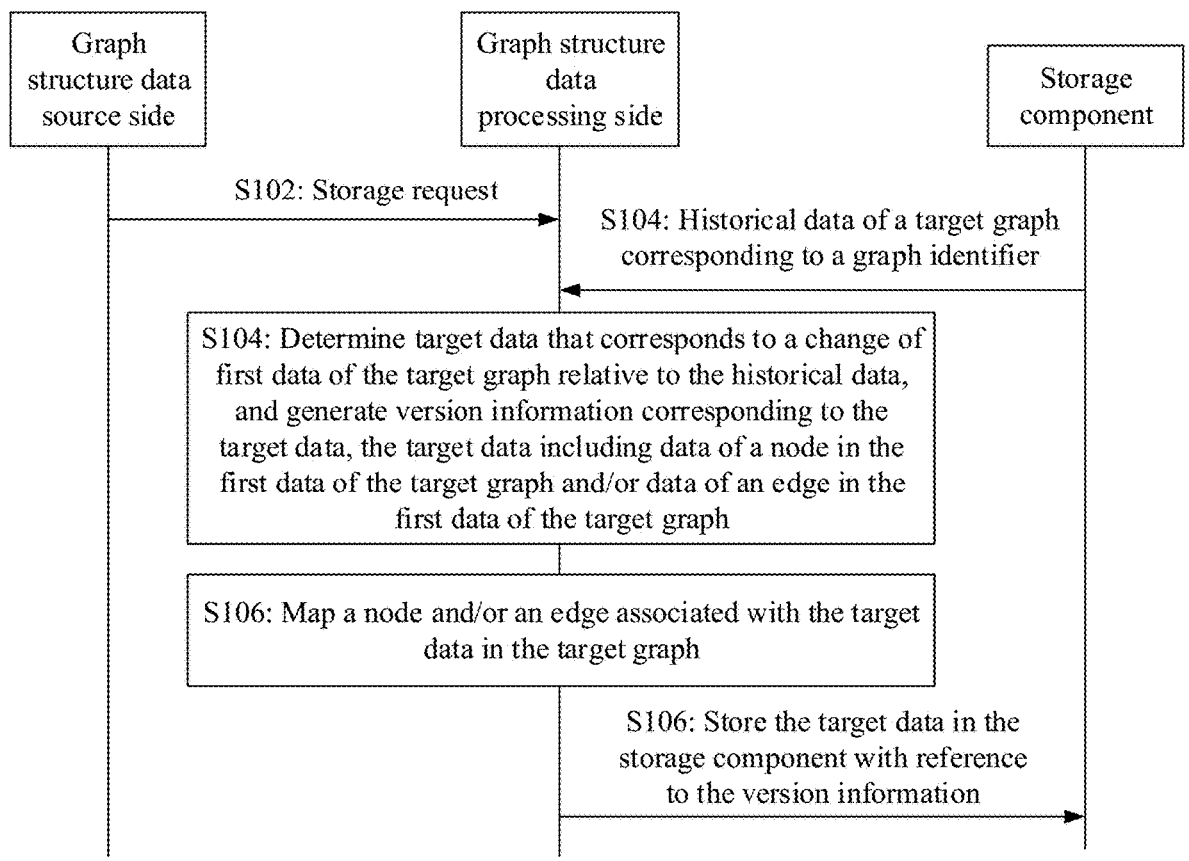
FIG. 1B is a schematic diagram illustrating a graph structure data processing process according to the present specification.

As shown in FIG. 1A and FIG. 1B, an implementation of the present specification provides a graph structure data processing method. The method can be performed by a terminal device, a storage engine in a terminal device, etc. The terminal device can be a mobile terminal device such as a mobile phone or a tablet computer, can be a computer device such as a notebook computer or a desktop computer, or can be an IoT device, which is, for example, a smartwatch or a vehicle-mounted device, etc.

The storage engine serving as the execution body can be a storage engine that can be used for graph structure data. The storage engine is a component or an apparatus that can implement technologies such as data storage, data index establishment, data update, and data query. In this implementation, the storage engine can, for example, include one or more of functional units such as data definition, data indexing, data storage, data loading, and data cleaning. Data definition can be used to distinguish between and define different versions of data. Data indexing can be used to search for duplicate data, to-be-modified data, to-be-deleted data, to-be-read data, etc. Data cleaning can be used to clear redundant data, to-be-deleted data, etc. In this implementation, a processing process of the graph structure data processing method can be performed by using the functional units in the storage engine. For example, the storage engine can receive a storage request for first data of a target graph; then, the storage engine can obtain historical data of the target graph corresponding to a graph identifier from a storage component based on the graph identifier, determine target data that corresponds to a change of the first data of the target graph relative to the historical data, and generate version information corresponding to the target data; and finally, the storage engine can map a node and/or an edge associated with the target data in the target graph, and store the target data in the storage component with reference to the version information. The method can include actions S102 to S106.

Action S102: Receive a storage request for first data of a target graph, the storage request including a graph identifier of the target graph and the first data.

The target graph can be any graph including a node and an edge, for example, a graph or a chart. In some implementations, the target graph can alternatively or additionally be a map, a knowledge graph, a person-thing relationship graph, a microservice component relationship graph, and program structures and semantic graphs of various graph structures (for example, a control flow graph and a call graph), especially large-scale graphs with frequent local changes, etc. The target graph can be a graph used to describe various entities and concepts existing in the real world and relationships between them. The graph can be a semantic network. The target graph can include a plurality of different nodes, and there can be an association relationship between different nodes. The association relationship can be represented by using an edge connecting the nodes. The edge can be a directed edge with a direction, an undirected edge without a direction, etc. This can, for example, be set based on an actual situation. The target graph can include a graph of a directed multigraph, or can be a mixed graph of a directed graph and an undirected graph. For example, if there is a bidirectional connecting edge between two nodes in a certain graph, the part can be used as a local part of the graph and considered to be undirected. There is also a case in which there is only a unidirectional connecting edge between other nodes. The target graph can be applied to a plurality of different services, for example, an online transaction service, a social service, a financial-related service, a risk prevention and control service, and a recommendation service. This can, for example, be set based on an actual situation, and is not limited in this implementation of the present specification. The node can represent any entity. For example, a certain node can represent a user, a certain node can represent an account, a certain node can represent a book, or a certain node can represent a television play or a movie. This can, for example, be set based on an actual situation, and is not limited in this implementation of the present specification. Attribute information of the node can include a plurality of types, for example, a name of the node, a category to which the node belongs, numerical attributes (for example, a size, a size of occupied space, and a height), and a location. This can, for example, be set based on an actual situation, and is not limited in this implementation of the present specification. The graph identifier can be a name, code, etc. of the target graph. This can, for example, be set based on an actual situation, and is not limited in this implementation of the present specification.

In implementations, graphs are used data structures that can be used to represent data of relatively complex topology structures, for example, a relationship between persons, a relationship between a person and a thing, and a relationship between things. The graphs are widely applied, and can represent topology structures inside large-scale microservice applications. For example, a program control flow graph represents control flow information in a method, and a program call graph represents call relationship information between methods. In daily life, the graphs are unconsciously used. For example, a common map navigation problem is essentially a problem of computing the k-shortest paths between two points in the graphs.

There are the following characteristics in computation and storage of the graphs: Computation of the graphs may be very time-consuming. For example, computing the k-shortest paths between any two points in relatively large maps is usually very time-consuming. In addition, the graphs are often prone to change. For example, some points and edges are often added or modified in maps. Furthermore, use of the graphs sometimes requires tracing back to previous versions. For example, change analysis performed because of version iteration of microservices requires comparison between two versions of the graphs. These characteristics bring some difficulty to use of the graphs. Particularly, a large amount of repeated computation and storage is caused due to active nature of the graphs. Although optimization can be performed for specific scenarios, the above manner cannot provide a sufficiently general solution for use of the graphs. Therefore, a representation manner that supports incremental storage of historical information of the graphs needs to be provided, to greatly reduce overheads for computation and storage of the graphs, so as to improve availability and ease of use of the graphs in microservices and other aspects. This implementation of the present specification provides an implementable technical solution, which can, for example, include the following content.

When a certain graph (e.g., the target graph) is to be stored in a storage component, the graph identifier of the target graph and the first data of the target graph can be obtained by using the terminal device, or the graph identifier and an identifier of the first data can be obtained, and the storage request for the first data of the target graph can be generated based on the obtained graph identifier and the obtained first data, or the storage request for the first data of the target graph can be generated based on the obtained graph identifier and the obtained identifier of the first data, and then the storage request for the first data of the target graph can be received or obtained.

It should be noted that a certain component (for example, a memory, a cache, or a CPU) in the terminal device can generate the storage request, and send the storage request to a specified management component, a processing component, which is, for example, a storage engine that can be used for graph structure data, etc. In this implementation, a storage engine that can be used for graph structure data in the terminal device can receive the storage request, perform further processing, and so on. In addition, another device can generate the storage request, and send the storage request to a storage engine that can be used for graph structure data in a specified terminal device or a storage engine that can be used for graph structure data in a server. The storage engine can receive the storage request, perform further processing, and so on. This can, for example, be set based on an actual situation, and is not limited in this implementation of the present specification.

Action S104: Obtain historical data of the target graph corresponding to the graph identifier from the storage component based on the graph identifier, determine target data that corresponds to a change of the first data of the target graph relative to the historical data, and generate version information corresponding to the target data, the target data including data of a node in the first data of the target graph and/or data of an edge in the first data of the target graph.

The storage component can be a component configured to store data. In some implementations, the storage component can be a persistent storage component, for example, an optical disc, a hard disk, or a USB flash drive. This can, for example, be set based on an actual situation, and is not limited in this implementation of the present specification.

The version information can be represented by using one or more characters, for example, V1, V2, 123, or 234, or can be constructed in a plurality of other manners. This can, for example, be set based on an actual situation. The data of the node can include a plurality of types, for example, can include an identifier and attribute information (for example, version information of a graph to which the node belongs and a relationship with another node) of the node. This can, for example, be set based on an actual situation, and is not limited in this implementation of the present specification.

In implementations, considering factors such as factors indicating that graphs are often prone to change, and use of the graphs sometimes requires tracing back to previous versions, the storage component stores a plurality of different versions of data of certain graph structure data. Therefore, after the storage request is obtained in the above manner, the graph identifier of the target graph can be extracted from the storage request, related data, of the target graph, having the graph identifier can be obtained from the storage component based on the graph identifier, and the obtained data can be used as the historical data of the target graph. Then, the first data of the target graph can be obtained, and the first data can be compared item by item with the historical data. Details are as follows: The node included in the first data can be separately compared with each node in the historical data, and the edge included in the first data can be separately compared with each edge in the historical data, to determine the target data that corresponds to the change of the first data relative to the historical data. For example, the first data includes three nodes a, b, and c, and two edges a-b and a-c, and the historical data includes three nodes a, b, and d, and two edges a-b and b-d. By comparing the first data with the historical data, the target data that corresponds to the change of the first data relative to the historical data can be obtained. For example, the node c is added, the node d in the historical data is deleted, the edge b-d in the historical data is deleted, the edge a-c is added, a weight of the edge a-b is modified, and so on. This can, for example, be set based on an actual situation, and is not limited in this implementation of the present specification. Then, the version information corresponding to the target data can be generated based on a predetermined coding mechanism. For example, details are as follows: Version information of latest stored graph-related data of the target graph is obtained, and the version information corresponding to the target data is generated based on the obtained version information by using the coding mechanism. For example, if the version information of the latest stored graph-related data of the target graph is V3, the generated version information corresponding to the target data can be V4. The version information can indicate a partial order relationship between corresponding graph structure data. For example, V4 is version information of data of a version later than V3. This can, for example, be set based on an actual situation, and is not limited in this implementation of the present specification.

Action S106: Map a node and/or an edge associated with the target data in the target graph, and store the target data in the storage component with reference to the version information.

In implementations, a mapping mechanism, a dynamic mapping protocol, etc. between a graph and change data can be predetermined based on an actual situation. The storage engine can map the node and/or the edge associated with the target data in the target graph by using the mapping mechanism or the dynamic mapping protocol, and then can store the target data in the storage component with reference to the obtained version information.

The graph structure data processing method provided in this implementation of the present specification can be implemented by using a storage engine for graph structure data. For example, the storage engine for graph structure data receives a storage request for first data of a target graph, the storage request including a graph identifier of the target graph and the first data; then, the storage engine obtains historical data of the target graph corresponding to the graph identifier from a storage component based on the graph identifier, and the storage engine determines target data that corresponds to a change of the first data of the target graph relative to the historical data, and generates version information corresponding to the target data, the target data including data of a node in the first data of the target graph and/or data of an edge in the first data of the target graph; and finally, the storage engine can map a node and/or an edge associated with the target data in the target graph, and store the target data in the storage component with reference to the version information. In this way, the storage engine for graph structure data can store different versions of graph structure data in the storage component at relatively low costs, and subsequently the storage engine can further restore a specific version of graph structure data from the storage component. The above processing by the storage engine ensures data integrity, and reduces overheads of the storage engine for computation and storage of the graph, especially in a scenario of frequent local changes of a large-scale or ultra-large-scale graph. In addition, a producer of the graph needs to determine only a node and an edge corresponding to a change relative to a previous version or a certain version of historical graph structure data, and performs storage by using the storage engine. This simplifies a data storage process and a logic, and improves data storage efficiency.

Figure 2:
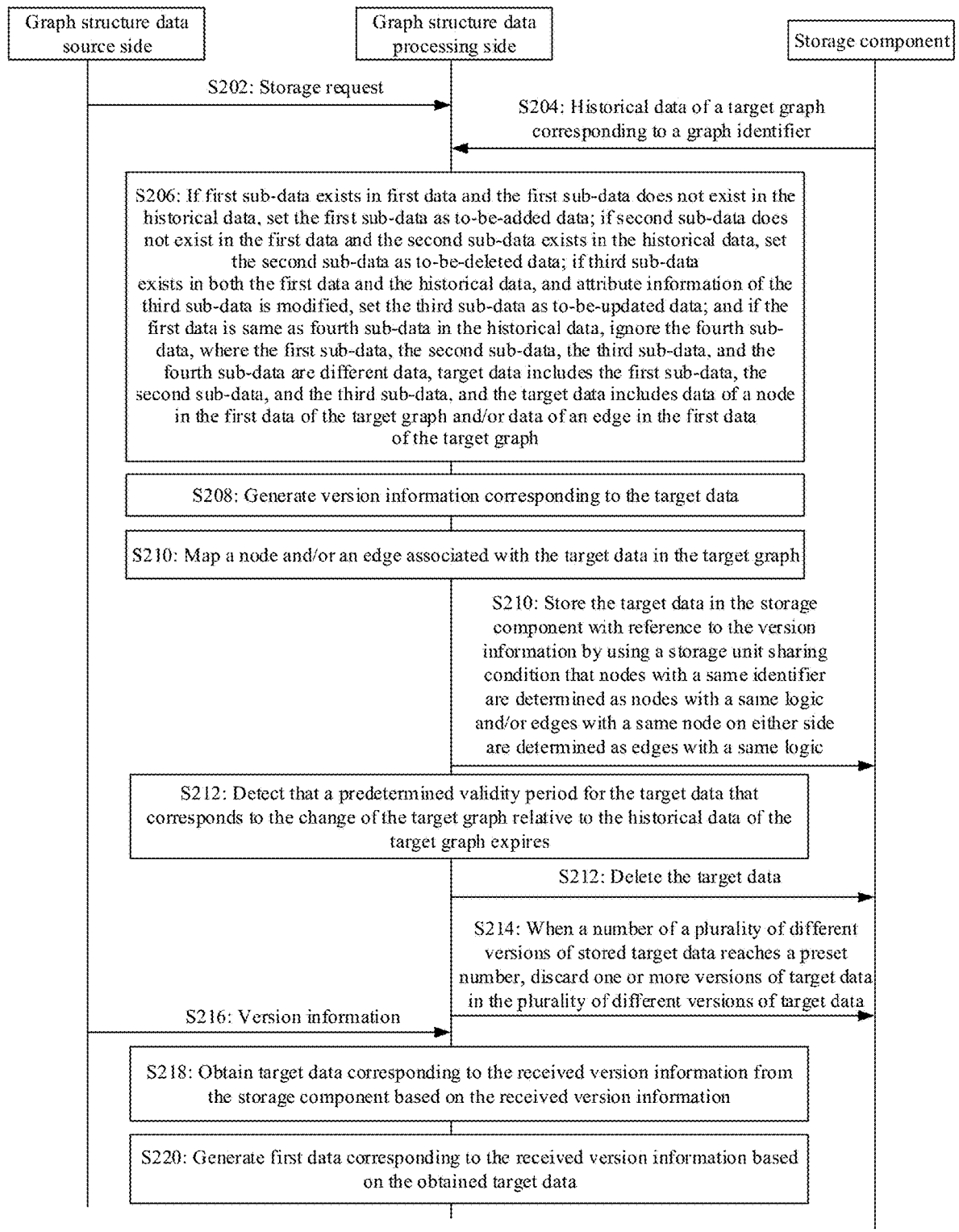
FIG. 2 is a schematic diagram illustrating another graph structure data processing process according to the present specification.

As shown in FIG. 2, an implementation of the present specification provides a graph structure data processing method. The method can be performed by a terminal device, a storage engine for graph structure data in a terminal device, etc. The terminal device can be a mobile terminal device such as a mobile phone or a tablet computer, can be a computer device such as a notebook computer or a desktop computer, or can be an IoT device, which is, for example, a smartwatch or a vehicle-mounted device, etc. The method can include actions S202 to S220.

Action S202: Receive, when a predetermined period is reached, a storage request that is for first data of a target graph and that is sent by a memory, the storage request including a graph identifier of the target graph and the first data.

The predetermined period can be set based on an actual situation. For example, the predetermined period is a specified time point or time period every day, can be a certain time point or time period at an interval of one or more days, or can be a specified time point or time period every month.

Figure 3:
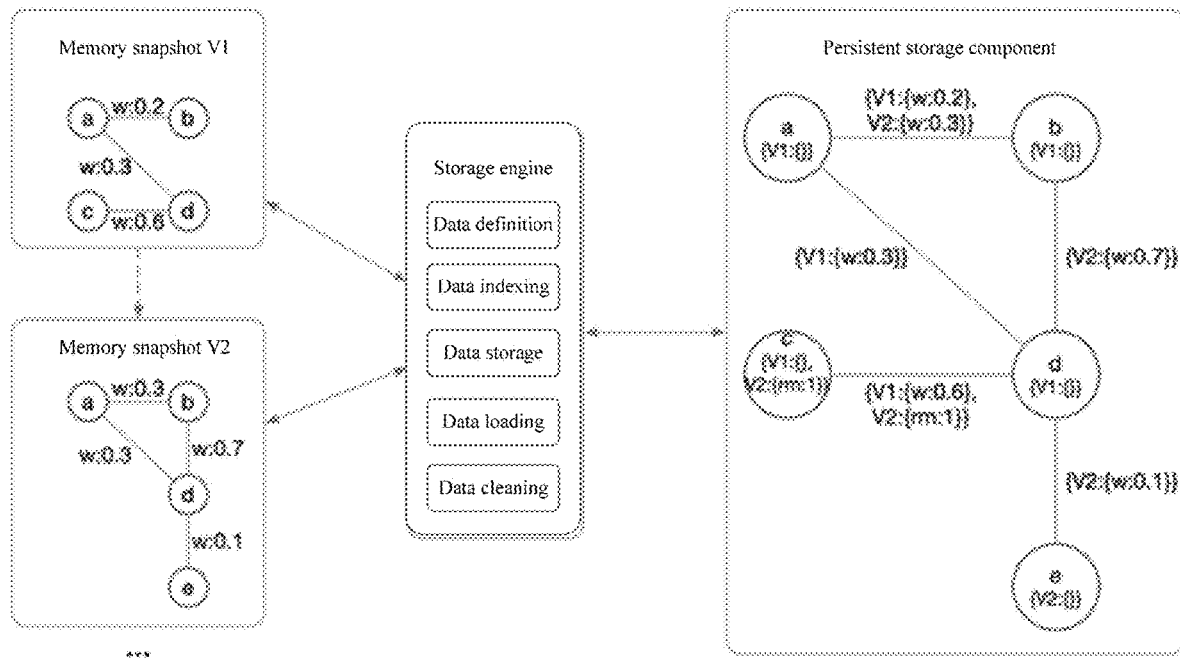
FIG. 3 is a schematic diagram illustrating still another graph structure data processing process according to the present specification.

In implementations, as shown in FIG. 3, a schematic diagram of storing a graph by the storage engine for graph structure data is described. A left side part shows snapshots of different versions of the graph in the memory, for example, version information V1 is version information of a first version of the target graph, version information V2 is version information of a second version of the target graph, and the version information V1 is version information of the target graph before the version information V2. A right side part shows a representation of the graph in a persistent storage component. An intermediate storage engine is configured to manage definition, indexing, storage, loading, cleaning, etc. of graph structure data in the memory snapshot and the persistent storage component. In this implementation, an execution body can be a storage engine described herein in a terminal device or a server. The graph structure data can be a graph in the memory snapshot, and can represent a complete state of a certain version of the graph in the memory. States of different versions of the graph are completely independent. Based on this, when the predetermined period is reached, the memory can obtain the graph identifier and the first data of the target graph, can generate the storage request for the first data of the target graph based on the obtained graph identifier and first data of the target graph, and can send the storage request to the storage engine. The storage engine can receive the storage request that is for the first data of the target graph and that is sent by the memory.

Action S204: Obtain historical data of the target graph corresponding to the graph identifier from a storage component based on the graph identifier.

In implementations, when the storage component performs data storage, data in the memory snapshot is stored in the persistent storage component. The graph can be stored in a form of an attribute graph in the persistent storage component, for example, any member of a node and an edge in the memory snapshot exists in a form of an attribute on a node and an edge of the persistent storage component. In the above storage process, a node and/or an edge corresponding to a change first need/needs to be determined, and latest states of the node and the edge are stored as attribute information of current version information. In the example shown in FIG. 3, after the memory snapshot V1 of the target graph is stored, data of an edge a-b is {V1:{w:0.2}, where V1 represents version information of the target graph, and w:0.2 indicates a weight (e.g., attribute information) of the edge a-b. Based on the above content, the historical data of the target graph corresponding to the graph identifier can be obtained from the storage component based on the graph identifier. For a specific processing process, references can be made to the above related content. Details are omitted herein for simplicity.

Action S206: If first sub-data exists in the first data and the first sub-data does not exist in the historical data, set the first sub-data as to-be-added data; if second sub-data does not exist in the first data and the second sub-data exists in the historical data, set the second sub-data as to-be-deleted data; if third sub-data exists in both the first data and the historical data, and attribute information of the third sub-data is modified, set the third sub-data as to-be-updated data; and if the first data is same as fourth sub-data in the historical data, ignore the fourth sub-data.

The first sub-data, the second sub-data, the third sub-data, and the fourth sub-data are different data, and target data includes the first sub-data, the second sub-data, and the third sub-data. The target data includes data of a node in the first data of the target graph and/or data of an edge in the first data of the target graph.

In implementations, as shown in FIG. 3, after graph structure data whose version information is V1 is stored, the data of the edge a-b is {V1:{w:0.2}}. After graph structure data whose version information is V2 is stored, the data of the edge a-b is updated to {V1:{w:0.2}, V2:{w:0.3}}. In addition, after the graph structure data whose version information is V1 is stored, there is a node c {V1:{ }}, and data of an edge c-d is {V1:{w:0.6}}. After the graph structure data whose version information is V2 is stored, there is no node c {V1:{ }, V2:{m:1}}, the data of the edge c-d is updated to {V1:{w:0.6}, V2:{m:1}}, a node e {V2:{ }} and data {V2:{w:0.1}} of an edge d-e is added, and so on. For details, references can be made to FIG. 3. Finally, corresponding target data can be obtained.

Action S208: Generate version information corresponding to the target data.

In implementations, FIG. 3 is used as an example. The target data can be a change part of data of the memory snapshot V2 relative to the memory snapshot V1. The corresponding version information can be set in a plurality of manners, for example, incremental data K1 or incremental data 1. This can, for example, be set based on an actual situation, and is not limited in this implementation of the present specification.

It should be noted that the generated version information corresponding to the target data can be same as version information of the graph structure data received in the memory, or can be different from version information of the graph structure data received in the memory. For example, new version information can be regenerated based on the version information of the graph structure data received in the memory and used as the version information corresponding to the target data, or the corresponding version information can be generated by using a specified version information generation rule. This can, for example, be set based on an actual situation, and is not limited in this implementation of the present specification.

Action S210: Map a node and/or an edge associated with the target data in the target graph, and store the target data in the storage component with reference to the version information by using a storage unit sharing condition that nodes with a same identifier are determined as nodes with a same logic and/or edges with a same node on either side are determined as edges with a same logic.

In implementations, in the persistent storage component, nodes and edges that have a same logic but may have different versions can share storage units. A format of the graph in the memory can be separated from a persistent format, and conversion between the two formats is completed through data definition. In data definition, a manner of determining whether nodes and edges have a same logic further needs to be provided. The memory snapshots V1 and V2 of the target graph in FIG. 3 are used as an example. If a condition for determining that nodes have same a logic is that it is determined that the nodes have a same identifier and a condition for determining that edges have a same logic is that it is determined that there is a same node on either side of the edges, nodes a, b, and d are nodes with a same logic, and a-b and a-d are edges with a same logic. Therefore, storage units can be shared in the persistent storage component. When the data in the memory snapshot is stored in the persistent storage component, the target graph is stored in a form of an attribute graph in the persistent storage component, for example, any member of the node and the edge in the memory snapshot exists in a form of an attribute on the node and the edge of the persistent storage component. In the above process, the node and the edge corresponding to the change need to be determined, and the latest states of the node and the edge are stored. For example, in the example in FIG. 3, after the memory snapshot V1 of the target graph is stored, the data of the edge a-b is {V1:{w: 0.2}}. After the memory snapshot V2 is stored, the data of the edge a-b is updated to {V1:{w:0.2}, V2:{w:0.3}}. For details, references can be made to the above related content and specific content in FIG. 3. Details are omitted herein for simplicity.

Action S212: In response to detecting that a predetermined validity period for the target data that corresponds to the change of the target graph relative to the historical data of the target graph expires, delete the target data from the storage component.

The validity period can be set based on an actual situation, for example, 1 month or 24 hours.

In implementations, historical information of the graph can have time validity, validity periods for different versions of graph structure data can be set based on different requirements, and graph structure data whose validity period expires can be periodically or aperiodically cleaned by using a background task. In this way, a data indexing time can be reduced, and a data amount in the persistent storage component can be further reduced.

In some implementations, the storage component can include a plurality of different versions of target data that corresponds to the change of the target graph relative to the historical data, and can further manage the plurality of different versions of target data. For details, references can be made to processing of the following action S214.

Action S214: When a number of the plurality of different versions of stored target data reaches a preset number, discard one or more versions of target data in the plurality of different versions of target data.

The predetermined number can be set based on an actual situation, for example, 1000 versions of data or 10000 versions of data.

In implementations, when discarding data, the storage engine can randomly select one or more different versions of target data for discarding, can discard one or more different versions of target data whose storage duration exceeds a first predetermined duration threshold, can discard one or more different versions of target data whose duration of reaching a validity period of the graph structure data exceeds a second predetermined duration threshold, or can discard one or more different versions of target data whose validity period is less than (or greater than) a predetermined validity period threshold. This can, for example, be set based on an actual situation, and is not limited in this implementation of the present specification.

In some implementations, in addition to storing the change graph structure data in the storage component, the storage engine can further load a specified version of graph structure data from the storage component into a component or a device such as the memory. For details, references can be made to processing of the following actions S216 to S220.

Action S216: Receive version information of to-be-read first data.

Action S218: Obtain target data corresponding to the received version information from the storage component based on the received version information.

Action S220: Generate the first data corresponding to the received version information based on the obtained target data.

To illustrate the implementations of action S218 and action S220, as shown in FIG. 3, an example in which the memory snapshot V2 is loaded is used. First, an order between different versions of the target graph is determined by using data indexing in the storage engine, for example, V2 is after V1, and a node and an edge belonging to the target graph are determined. Then, the storage engine restores the node and the edge in the target graph to states of V2. For example, for the three nodes a, b, and d, V2 has no modifications compared with V1, and therefore a state of a previous version (e.g., V1) closest to V2 is loaded; the node c is deleted from V2, and therefore does not need to be loaded; and the node e is a new node added to V2, and therefore V2 is loaded. The edge can also be loaded in a manner similar to the above manner. Details are omitted herein for simplicity. Finally, the storage engine can generate the first data (e.g., data of the V2 version of the target graph) corresponding to the received version information, and can provide the generated first data corresponding to the received version information to a reader.

As shown in FIG. 3, the five functional modules in the storage engine form an organism that can store different versions of graph structure data in the persistent storage component at relatively low costs, and can further restore a specific version of graph structure data from the persistent storage component. The storage engine ensures data integrity, reduces overheads of the storage engine for computation and storage of the graph, and is particularly applicable to a scenario of frequent local changes of a large-scale or ultra-large-scale graph. The storage engine is completely transparent for a consumer of the graph. A producer of the graph needs to determine only a node and an edge corresponding to a change relative to a previous version or a certain version of historical graph structure data, and performs storage by using the storage engine.

The graph structure data processing method provided in this implementation of the present specification can be implemented by using a storage engine for graph structure data. For example, the storage engine for graph structure data receives a storage request for first data of a target graph, the storage request including a graph identifier of the target graph and the first data; then, the storage engine obtains historical data of the target graph corresponding to the graph identifier from a storage component based on the graph identifier, and the storage engine determines target data that corresponds to a change of the first data of the target graph relative to the historical data, and generates version information corresponding to the target data, the target data including data of a node in the first data of the target graph and/or data of an edge in the first data of the target graph; and finally, the storage engine can map a node and/or an edge associated with the target data in the target graph, and store the target data in the storage component with reference to the version information. In this way, the storage engine for graph structure data can store different versions of graph structure data in the storage component at relatively low costs, and subsequently can further restore a specific version of graph structure data from the storage component. The above processing by the storage engine ensures data integrity, and reduces overheads of the storage engine for computation and storage of the graph, especially in a scenario of frequent local changes of a large-scale or ultra-large-scale graph. In addition, a producer of the graph needs to determine only a node and an edge corresponding to a change relative to a previous version or a certain version of historical graph structure data, and performs storage by using the storage engine. This simplifies a data storage process and a logic, and improves data storage efficiency.

Figure 4:
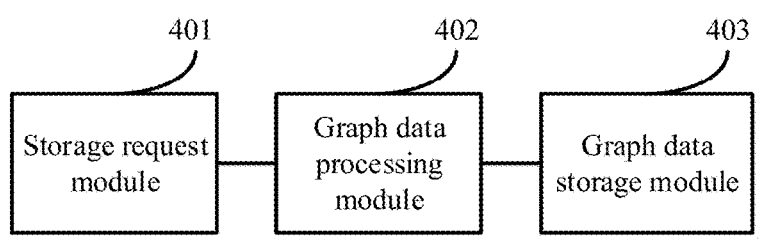
FIG. 4 shows an implementation illustrating a storage engine for graph structure data according to the present specification.

The graph structure data processing method provided in the implementations of the present specification is described herein. Based on a same idea, an implementation of the present specification further provides a storage engine for graph structure data, which can be configured to process the graph structure data processing method. The storage engine can be shown in FIG. 4.

The storage engine for graph structure data includes a storage request module 401, a graph data processing module 402, and a graph data storage module 403. The storage request module 401 is configured to receive a storage request for first data of a target graph, the storage request including a graph identifier of the target graph and the first data. The graph data processing module 402 is configured to: obtain historical data of the target graph corresponding to the graph identifier from a storage component based on the graph identifier, determine target data that corresponds to a change of the first data of the target graph relative to the historical data, and generate version information corresponding to the target data, the target data including data of a node in the first data of the target graph and/or data of an edge in the first data of the target graph. The graph data storage module 403 is configured to: map a node and/or an edge associated with the target data in the target graph, and store the target data in the storage component with reference to the version information.

In this implementation of the present specification, the graph data processing module 402 includes: a first processing unit, configured to: if first sub-data exists in the first data and the first sub-data does not exist in the historical data, set the first sub-data as to-be-added data; a second processing unit, configured to: if second sub-data does not exist in the first data and the second sub-data exists in the historical data, set the second sub-data as to-be-deleted data; a third processing unit, configured to: if third sub-data exists in both the first data and the historical data, and attribute information of the third sub-data is modified, set the third sub-data as to-be-updated data; and a fourth processing unit, configured to: if the first data is same as fourth sub-data in the historical data, ignore the fourth sub-data, where the first sub-data, the second sub-data, the third sub-data, and the fourth sub-data are different data, and the target data includes the first sub-data, the second sub-data, and the third sub-data.

In this implementation of the present specification, the storage engine for graph structure data further includes: a read request module, configured to receive version information of to-be-read first data; a first data acquisition module, configured to obtain target data corresponding to the received version information from the storage component based on the received version information; and a second data acquisition module, configured to generate the first data corresponding to the received version information based on the obtained target data.

In this implementation of the present specification, the graph data storage module 403 is configured to: map the node and/or the edge associated with the target data in the target graph, and store the target data in the storage component with reference to the version information by using a storage unit sharing condition that nodes with a same identifier are determined as nodes with a same logic and/or edges with a same node on either side are determined as edges with a same logic.

In this implementation of the present specification, the storage engine for graph structure data further includes a data deletion module, configured to: in response to detecting that a predetermined validity period for the target data that corresponds to the change of the target graph relative to the historical data of the target graph expires, delete the target data from the storage component.

In this implementation of the present specification, the storage request module 401 is configured to receive, when a predetermined period is reached, the storage request that is for the first data of the target graph and that is sent by a memory, where the storage component is a persistent storage component.

In this implementation of the present specification, the storage component includes a plurality of different versions of target data that corresponds to the change of the target graph relative to the historical data, and the storage engine for graph structure data further includes a discarding module, configured to: when a number of the plurality of different versions of stored target data reaches a preset number, discard one or more versions of target data in the plurality of different versions of target data.

The storage engine for graph structure data provided in this implementation of the present specification receives a storage request for first data of a target graph, the storage request including a graph identifier of the target graph and the first data; then, obtains historical data of the target graph corresponding to the graph identifier from a storage component based on the graph identifier, determines target data that corresponds to a change of the first data of the target graph relative to the historical data, and generates version information corresponding to the target data, the target data including data of a node in the first data of the target graph and/or data of an edge in the first data of the target graph; and finally, can map a node and/or an edge associated with the target data in the target graph, and store the target data in the storage component with reference to the version information. In this way, the storage engine for graph structure data can store different versions of graph structure data in the storage component at relatively low costs, and subsequently the storage engine can further restore a specific version of graph structure data from the storage component. The above processing by the storage engine ensures data integrity, and reduces overheads of the storage engine for computation and storage of the graph, especially in a scenario of frequent local changes of a large-scale or ultra-large-scale graph. In addition, a producer of the graph needs to determine only a node and an edge corresponding to a change relative to a previous version or a certain version of historical graph structure data, and performs storage by using the storage engine. This simplifies a data storage process and a logic, and improves data storage efficiency.

Figure 5:
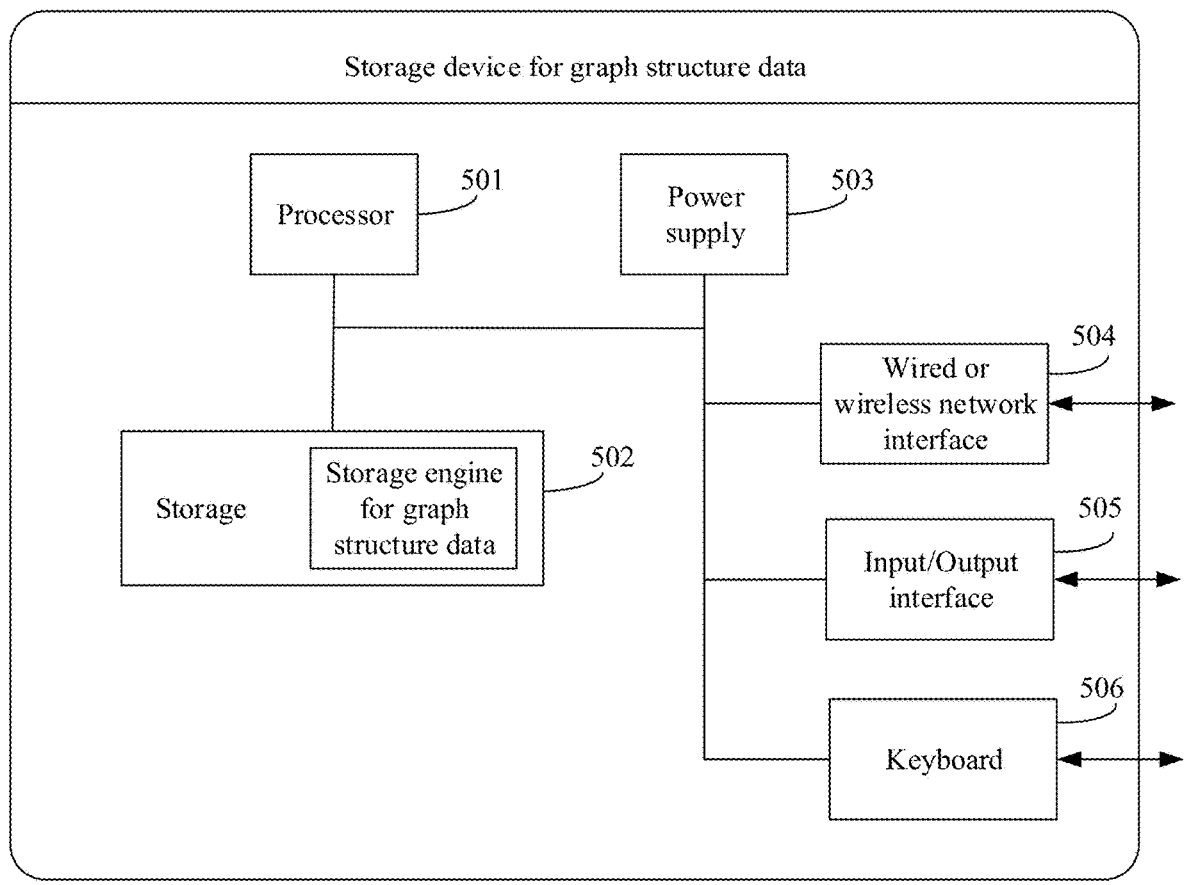
FIG. 5 shows an implementation of a storage device for graph structure data according to the present specification.

The storage engine for graph structure data provided in the implementations of the present specification is described herein. Based on a same idea, an implementation of the present specification further provides a storage device for graph structure data. The storage device for graph structure data includes the above storage engine for graph structure data. The storage device for graph structure data can be shown in FIG. 5.

The storage device for graph structure data can be the terminal device provided in the above implementation, a storage device in the terminal device, etc.

The storage device for graph structure data can differ greatly because of a difference in configuration or performance, and can include one or more processors 501 and a storage 502. The storage 502 can store one or more application programs or data. The storage 502 can be a temporary storage or a persistent storage. The application program stored in the storage 502 can include one or more modules (not shown in the figure), and each module can include a series of computer-executable instructions in the storage device for graph structure data. Further, the processor 501 can be configured to communicate with the storage 502, and execute the series of computer-executable instructions in the storage 502 on the storage device for graph structure data. The storage device for graph structure data can further include one or more power supplies 503, one or more wired or wireless network interfaces 504, one or more input/output interfaces 505, and one or more keyboards 506.

For example, in this implementation, the storage device for graph structure data includes a storage and one or more programs. The one or more programs are stored in the storage, the one or more programs can include one or more modules, and each module can include a series of computer-executable instructions in the storage device for graph structure data. One or more storage engine that can be used for graph structure data are configured to execute the computer-executable instructions included in the one or more programs to perform the following operations: receiving a storage request for first data of a target graph, the storage request including a graph identifier of the target graph and the first data; obtaining historical data of the target graph corresponding to the graph identifier from a storage component based on the graph identifier, determining target data that corresponds to a change of the first data of the target graph relative to the historical data, and generating version information corresponding to the target data, the target data including data of a node in the first data of the target graph and/or data of an edge in the first data of the target graph; and mapping a node and/or an edge associated with the target data in the target graph, and storing the target data in the storage component with reference to the version information.

In this implementation of the present specification, the determining the target data that corresponds to the change of the first data of the target graph relative to the historical data includes: if first sub-data exists in the first data and the first sub-data does not exist in the historical data, setting the first sub-data as to-be-added data; if second sub-data does not exist in the first data and the second sub-data exists in the historical data, setting the second sub-data as to-be-deleted data; if third sub-data exists in both the first data and the historical data, and attribute information of the third sub-data is modified, setting the third sub-data as to-be-updated data; and if the first data is same as fourth sub-data in the historical data, ignoring the fourth sub-data, where the first sub-data, the second sub-data, the third sub-data, and the fourth sub-data are different data, and the target data includes the first sub-data, the second sub-data, and the third sub-data.

In this implementation of the present specification, the following is further included: receiving version information of to-be-read first data; obtaining target data corresponding to the received version information from the storage component based on the received version information; and generating the first data corresponding to the received version information based on the obtained target data.

In this implementation of the present specification, the mapping the node and/or the edge associated with the target data in the target graph, and storing the target data in the storage component with reference to the version information includes: mapping the node and/or the edge associated with the target data in the target graph, and storing the target data in the storage component with reference to the version information by using a storage unit sharing condition that nodes with a same identifier are determined as nodes with a same logic and/or edges with a same node on either side are determined as edges with a same logic.

In this implementation of the present specification, the following is further included: in response to detecting that a predetermined validity period for the target data that corresponds to the change of the target graph relative to the historical data of the target graph expires, deleting the target data from the storage component.

In this implementation of the present specification, the receiving the storage request for the first data of the target graph includes: receiving, when a predetermined period is reached, the storage request that is for the first data of the target graph and that is sent by a memory, where the storage component is a persistent storage component.

In this implementation of the present specification, the storage component includes a plurality of different versions of target data that corresponds to the change of the target graph relative to the historical data, and the following is further included: when a number of the plurality of different versions of stored target data reaches a preset number, discarding one or more versions of target data in the plurality of different versions of target data.

The storage device for graph structure data provided in this implementation of the present specification includes a storage engine for graph structure data. The storage engine can receive a storage request for first data of a target graph, the storage request including a graph identifier of the target graph and the first data; then, the storage engine obtains historical data of the target graph corresponding to the graph identifier from a storage component based on the graph identifier, and the storage engine determines target data that corresponds to a change of the first data of the target graph relative to the historical data, and generates version information corresponding to the target data, the target data including data of a node in the first data of the target graph and/or data of an edge in the first data of the target graph; and finally, the storage engine can map a node and/or an edge associated with the target data in the target graph, and store the target data in the storage component with reference to the version information. In this way, the storage engine for graph structure data can store different versions of graph structure data in the storage component at relatively low costs, and subsequently the storage engine can further restore a specific version of graph structure data from the storage component. The above processing by the storage engine ensures data integrity, and reduces overheads of the storage engine for computation and storage of the graph, especially in a scenario of frequent local changes of a large-scale or ultra-large-scale graph. In addition, a producer of the graph needs to determine only a node and an edge corresponding to a change relative to a previous version or a certain version of historical graph structure data, and performs storage by using the storage engine. This simplifies a data storage process and a logic, and improves data storage efficiency.

Further, based on the above methods shown in FIG. 1A to FIG. 3, one or more implementations of the present specification further provide a storage medium, configured to store computer-executable instruction information. In a specific implementation, the storage medium can be a USB flash drive, an optical disc, a hard disk, etc. When the computer-executable instruction information stored in the storage medium is executed, a storage engine for graph structure data correspondingly is capable of implementing the following procedure: receiving a storage request for first data of a target graph, the storage request including a graph identifier of the target graph and the first data; obtaining historical data of the target graph corresponding to the graph identifier from a storage component based on the graph identifier, determining target data that corresponds to a change of the first data of the target graph relative to the historical data, and generating version information corresponding to the target data, the target data including data of a node in the first data of the target graph and/or data of an edge in the first data of the target graph; and mapping a node and/or an edge associated with the target data in the target graph, and storing the target data in the storage component with reference to the version information.

In this implementation of the present specification, the determining the target data that corresponds to the change of the first data of the target graph relative to the historical data includes: if first sub-data exists in the first data and the first sub-data does not exist in the historical data, setting the first sub-data as to-be-added data; if second sub-data does not exist in the first data and the second sub-data exists in the historical data, setting the second sub-data as to-be-deleted data; if third sub-data exists in both the first data and the historical data, and attribute information of the third sub-data is modified, setting the third sub-data as to-be-updated data; and if the first data is same as fourth sub-data in the historical data, ignoring the fourth sub-data, where the first sub-data, the second sub-data, the third sub-data, and the fourth sub-data are different data, and the target data includes the first sub-data, the second sub-data, and the third sub-data.

In this implementation of the present specification, the following is further included: receiving version information of to-be-read first data; obtaining target data corresponding to the received version information from the storage component based on the received version information; and generating the first data corresponding to the received version information based on the obtained target data.

In this implementation of the present specification, the mapping the node and/or the edge associated with the target data in the target graph, and storing the target data in the storage component with reference to the version information includes: mapping the node and/or the edge associated with the target data in the target graph, and storing the target data in the storage component with reference to the version information by using a storage unit sharing condition that nodes with a same identifier are determined as nodes with a same logic and/or edges with a same node on either side are determined as edges with a same logic.

In this implementation of the present specification, the following is further included: in response to detecting that a predetermined validity period for the target data that corresponds to the change of the target graph relative to the historical data of the target graph expires, deleting the target data from the storage component.

In this implementation of the present specification, the receiving the storage request for the first data of the target graph includes: receiving, when a predetermined period is reached, the storage request that is for the first data of the target graph and that is sent by a memory, where the storage component is a persistent storage component.

In this implementation of the present specification, the storage component includes a plurality of different versions of target data that corresponds to the change of the target graph relative to the historical data, and the following is further included: when a number of the plurality of different versions of stored target data reaches a preset number, discarding one or more versions of target data in the plurality of different versions of target data.

The storage medium provided in this implementation of the present specification triggers a storage engine for graph structure data to receive a storage request for first data of a target graph, the storage request including a graph identifier of the target graph and the first data; then, triggers the storage engine to obtain historical data of the target graph corresponding to the graph identifier from a storage component based on the graph identifier, and triggers the storage engine to determine target data that corresponds to a change of the first data of the target graph relative to the historical data, and generate version information corresponding to the target data, the target data including data of a node in the first data of the target graph and/or data of an edge in the first data of the target graph; and finally, triggers the storage engine to map a node and/or an edge associated with the target data in the target graph, and store the target data in the storage component with reference to the version information. In this way, the storage engine for graph structure data is triggered to store different versions of graph structure data in the storage component at relatively low costs, and subsequently the storage engine can further restore a specific version of graph structure data from the storage component. The above processing by the storage engine ensures data integrity, and reduces overheads of the storage engine for computation and storage of the graph, especially in a scenario of frequent local changes of a large-scale or ultra-large-scale graph. In addition, a producer of the graph needs to determine only a node and an edge corresponding to a change relative to a previous version or a certain version of historical graph structure data, and performs storage by using the storage engine. This simplifies a data storage process and a logic, and improves data storage efficiency.

Specific implementations of the present specification are described herein. Other implementations fall within the scope of the appended claims. In some cases, actions or actions described in the claims can be performed in an order different from that in the implementations and the desired results can still be achieved. In addition, the process depicted in the accompanying drawings does not necessarily need a particular order or consecutive order to achieve the desired results. In some implementations, multi-tasking and parallel processing are feasible or may be advantageous.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. Almost all designers program an improved method procedure into a hardware circuit, to obtain a corresponding hardware circuit structure. Therefore, an improvement to a method procedure can be implemented by using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, currently, instead of manually manufacturing an integrated circuit chip, such programming is mostly implemented by using "logic compiler" software. The "logic compiler" software is similar to a software compiler used to develop and write a program. Original code needs to be written in a particular programming language before being compiled. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). At present, the Very-High-Speed Integrated Circuit Hardware Description Language (VHDL) and Verilog may be used. It should also be clear to a person skilled in the art that a hardware circuit that implements a logical method procedure can be readily obtained once the method procedure is logically programmed by using the several hardware description languages described herein and is programmed into an integrated circuit.

A controller can be implemented in any suitable manner. For example, the controller can be in a form such as a microprocessor, a processor, or a computer-readable medium, a logic gate, a switch, an application-specific integrated circuit (ASIC), a programmable logic controller, or an embedded microcontroller storing computer-readable program code (such as software or firmware) that can be executed by the (micro)processor. Examples of the controller include but are not limited to the following microcontrollers: ARC 625D, Atmel AT91SAM, Microchip PIC18F26K20, and Silicone Labs C8051F320. A storage controller can also be implemented as a part of control logic of a storage. A person skilled in the art also knows that in addition to implementing the controller by using only the computer-readable program code, logic programming can be performed on method actions to enable the controller to implement the same function in a form of a logic gate, a switch, an application specific integrated circuit, a programmable logic controller, or an embedded microcontroller. Therefore, the controller can be considered as a hardware component, and an apparatus configured to implement various functions in the controller can also be considered as a structure in the hardware component. Alternatively, an apparatus configured to implement various functions can even be considered as both a software module implementing the method and a structure in the hardware component.

The systems, apparatuses, modules, or units described in the above implementations can be specifically implemented by a computer chip or an entity, or can be implemented by a product having a certain function. A typical implementation device is a computer. For example, the computer can be a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the above apparatus is described by dividing functions into various units. Certainly, when one or more implementations of the present specification are implemented, functions of the units can be implemented in one or more pieces of software and/or hardware.

A person skilled in the art should understand that the implementations of the present specification can be provided as methods, systems, or computer program products. Therefore, the one or more implementations of the present application can use a form of hardware only implementations, software only implementations, or implementations with a combination of software and hardware. Furthermore, the one or more implementations of the present specification can use a form of a computer program product that is implemented on one or more computer-usable storage media (including but not limited to a disk memory, a CD-ROM, an optical memory, etc.) that include computer-usable program code.

The implementations of the present specification are described with reference to the flowcharts and/or block diagrams of the method, the device (system), and the computer program product according to the implementations of the present specification. It should be understood that computer program instructions can be used to implement each procedure and/or each block in the flowcharts and/or the block diagrams and a combination of a procedure and/or a block in the flowcharts and/or the block diagrams. These computer program instructions can be provided for a general-purpose computer, a dedicated computer, an embedded processor, or a processor of another programmable fraud case serial-to-parallel device to generate a machine, so that the instructions executed by the computer or the processor of the another programmable fraud case serial-to-parallel device generate a device for implementing a specific function in one or more procedures in the flowcharts and/or in one or more blocks in the block diagrams.

Alternatively, these computer program instructions can be stored in a computer-readable memory that can instruct a computer or another programmable fraud case serial-to-parallel device to work in a specific manner, so the instructions stored in the computer-readable memory generate an artifact that includes an instruction apparatus. The instruction apparatus implements a specific function in one or more procedures in the flowcharts and/or in one or more blocks in the block diagrams.

Alternatively, these computer program instructions can be loaded onto a computer or another programmable fraudulent case serial-parallel device, so that a series of operations and actions are performed on the computer or the another programmable device, to generate computer-implemented processing. Therefore, the instructions executed on the computer or the another programmable device provide actions for implementing a specific function in one or more procedures in the flowcharts and/or in one or more blocks in the block diagrams.

In a typical configuration, a computing device includes one or more central processing units (CPUs), input/output interfaces, network interfaces, and memories.

The memory can include a non-persistent memory, a random access memory (RAM), a nonvolatile memory, and/or another form in a computer-readable medium, for example, a read-only memory (ROM) or a flash memory (flash RAM). The memory is an example of the-computer readable medium.

The computer-readable medium includes persistent, non-persistent, removable and non-removable media that can store information by using any method or technology. The information can be computer-readable instructions, a data structure, a program module, or other data. Examples of the computer storage medium include but are not limited to a phase change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be configured to store information that can be accessed by a computing device. As described in the present specification, the computer-readable medium does not include transitory computer-readable media (transitory media) such as a modulated data signal and a carrier.

It should be further noted that the terms "include", "comprise", or their any other variants are intended to cover a non-exclusive inclusion, so that a process, a method, a product, or a device that includes a list of elements not only includes those elements but also includes other elements which are not expressly listed, or further includes elements inherent to such a process, method, product, or device. Without more constraints, an element preceded by "includes a . . . " does not preclude the presence of additional identical elements in the process, method, product, or device that includes the element.

A person skilled in the art should understand that the implementations of the present specification can be provided as methods, systems, or computer program products. Therefore, the one or more implementations of the present application can use a form of hardware only implementations, software only implementations, or implementations with a combination of software and hardware. Furthermore, the one or more implementations of the present specification can use a form of a computer program product that is implemented on one or more computer-usable storage media (including but not limited to a disk memory, a CD-ROM, an optical memory, etc.) that include computer-usable program code.

The one or more implementations of the present specification can be described in contexts of computer-executable instructions executed by a computer, such as a program module. Generally, the program module includes a routine, a program, an object, a component, a data structure, etc. for executing a specific task or implementing a specific abstract data type. One or more implementations of the present specification can alternatively be practiced in distributed computing environments in which tasks are performed by remote processing devices that are connected through a communications network. In the distributed computing environments, the program module can be located in local and remote computer storage media including storage devices.

The implementations of the present specification are described in a progressive manner. For same or similar parts of the implementations, mutual references can be made to the implementations. Each implementation focuses on a difference from the other implementations. Particularly, the system implementations are basically similar to the method implementations, and therefore are described briefly. For related parts, references can be made to some descriptions of the method implementations.

The above descriptions are merely implementations of the present specification and are not intended to limit the present application. A person skilled in the art can make various modifications and variations to the present specification. Any modifications, equivalent replacements, improvements, etc. made without departing from the spirit and principle of the present specification shall fall within the scope of the claims of the present specification.

What is claimed is:

1. A method for processing graph structure data, the method comprising:
   receiving a storage request for first data of a target graph, the storage request including a graph identifier of the target graph and the first data;
   obtaining historical data of the target graph corresponding to the graph identifier from a storage component based on the graph identifier;
   determining target data that corresponds to a change part of the first data relative to the historical data, the target data including one or more of data of a node in the first data of the target graph or data of an edge in the first data of the target graph;
   generating version information corresponding to the target data; and
   storing the target data in the storage component with reference to the version information.

2. The method according to claim 1, wherein the determining the target data that corresponds to the change part of the first data of the target graph relative to the historical data includes:
in response to first sub-data exists in the first data and the first sub-data does not exist in the historical data, setting the first sub-data as to-be-added data;
in response to second sub-data does not exist in the first data and the second sub-data exists in the historical data, setting the second sub-data as to-be-deleted data;
in response to third sub-data exists in both the first data and the historical data, and attribute information of the third sub-data is modified, setting the third sub-data as to-be-updated data; and
in response to the first data is same as fourth sub-data in the historical data, ignoring the fourth sub-data,
wherein the target data includes one or more of the to-be-added data, the to-be-deleted data, or the to-be-updated data.

3. The method according to claim 1, further comprising:
receiving version information of to-be-read data;
obtaining target data corresponding to the version information of the to-be-read data from the storage component; and
generating the to-be-read data corresponding to the version information of the to-be-read data based on the target data obtained.

4. The method according to claim 1, comprising:
mapping one or more of a node or an edge associated with the target data in the target graph, wherein the storing the target data in the storage component with reference to the version information includes storing the target data in the storage component in compliance with one or more of:
nodes with a same identifier are determined as nodes with a same logic; or
edges with a same node on either side are determined as edges with a same logic.

5. The method according to claim 1, further comprising:
in response to detecting that a validity period for the target data expires, deleting the target data from the storage component.

6. The method according to claim 1, wherein the receiving the storage request for the first data of the target graph includes:
receiving, when a determined period is reached, the storage request from a memory, wherein the storage component is a persistent storage component.

7. The method according to claim 1, wherein the storage component includes a plurality of different versions of target data that each corresponds to a change part of the target graph relative to historical data, and the method further comprises:
when a number of the plurality of different versions of target data reaches a threshold number, discarding one or more versions of target data in the plurality of different versions of target data.

8. A computing system for processing graph structure data, the computing system comprising one or more processors and one or more storage devices individually or collectively having computer executable instructions stored thereon, the computer executable instructions when executed by the one or more processors enabling the one or more processors to, individually or collectively implement acts including:
receiving a storage request for first data of a target graph, the storage request including a graph identifier of the target graph and the first data;
obtaining historical data of the target graph corresponding to the graph identifier from a storage component based on the graph identifier;
determining target data that corresponds to a change part of the first data relative to the historical data, the target data including one or more of data of a node in the first data of the target graph or data of an edge in the first data of the target graph;
generating version information corresponding to the target data; and
storing the target data in the storage component with reference to the version information.

9. The computing system according to claim 8, wherein the determining the target data that corresponds to the change part of the first data of the target graph relative to the historical data includes:
in response to first sub-data exists in the first data and the first sub-data does not exist in the historical data, setting the first sub-data as to-be-added data;
in response to second sub-data does not exist in the first data and the second sub-data exists in the historical data, setting the second sub-data as to-be-deleted data;
in response to third sub-data exists in both the first data and the historical data, and attribute information of the third sub-data is modified, setting the third sub-data as to-be-updated data; and
in response to the first data is same as fourth sub-data in the historical data, ignoring the fourth sub-data,
wherein the target data includes one or more of the to-be-added data, the to-be-deleted data, or the to-be-updated data.

10. The computing system according to claim 8, wherein the acts further include:
receiving version information of to-be-read data;
obtaining target data corresponding to the version information of the to-be-read data from the storage component; and
generating the to-be-read data corresponding to the version information of the to-be-read data based on the target data obtained.

11. The computing system according to claim 8, wherein the acts further include:
mapping one or more of a node or an edge associated with the target data in the target graph, wherein the storing the target data in the storage component with reference to the version information includes storing the target data in the storage component in compliance with one or more of:
nodes with a same identifier are determined as nodes with a same logic; or
edges with a same node on either side are determined as edges with a same logic.

12. The computing system according to claim 8, wherein the acts further include:
in response to detecting that a validity period for the target data expires, deleting the target data from the storage component.

13. The computing system according to claim 8, wherein the receiving the storage request for the first data of the target graph includes:
receiving, when a determined period is reached, the storage request from a memory, wherein the storage component is a persistent storage component.

14. The computing system according to claim 8, wherein the storage component includes a plurality of different versions of target data that each corresponds to a change part of the target graph relative to historical data, and the method further comprises:
when a number of the plurality of different versions of target data reaches a threshold number, discarding one or more versions of target data in the plurality of different versions of target data.

15. A computer storage medium having computer executable instructions stored thereon, the computer executable instructions when executed by one or more processors enabling the one or more processors to, individually or collectively implement acts including:
receiving a storage request for first data of a target graph, the storage request including a graph identifier of the target graph and the first data;
obtaining historical data of the target graph corresponding to the graph identifier from a storage component based on the graph identifier;
determining target data that corresponds to a change part of the first data relative to the historical data, the target data including one or more of data of a node in the first data of the target graph or data of an edge in the first data of the target graph;
generating version information corresponding to the target data; and
storing the target data in the storage component with reference to the version information.

16. The computer storage medium according to claim 15, wherein the determining the target data that corresponds to the change part of the first data of the target graph relative to the historical data includes:
in response to first sub-data exists in the first data and the first sub-data does not exist in the historical data, setting the first sub-data as to-be-added data;
in response to second sub-data does not exist in the first data and the second sub-data exists in the historical data, setting the second sub-data as to-be-deleted data;
in response to third sub-data exists in both the first data and the historical data, and attribute information of the third sub-data is modified, setting the third sub-data as to-be-updated data; and
in response to the first data is same as fourth sub-data in the historical data, ignoring the fourth sub-data,
wherein the target data includes one or more of the to-be-added data, the to-be-deleted data, or the to-be-updated data.

17. The computer storage medium according to claim 15, wherein the acts further include:
receiving version information of to-be-read data;
obtaining target data corresponding to the version information of the to-be-read data from the storage component; and
generating the to-be-read data corresponding to the version information of the to-be-read data based on the target data obtained.

18. The computer storage medium according to claim 15, wherein the acts further include:
mapping one or more of a node or an edge associated with the target data in the target graph, wherein the storing the target data in the storage component with reference to the version information includes storing the target data in the storage component in compliance with one or more of:
nodes with a same identifier are determined as nodes with a same logic; or
edges with a same node on either side are determined as edges with a same logic.

19. The computer storage medium according to claim 15, wherein the acts further include:
in response to detecting that a validity period for the target data expires, deleting the target data from the storage component.

20. The computer storage medium according to claim 15, wherein the receiving the storage request for the first data of the target graph includes:
receiving, when a determined period is reached, the storage request from a memory, wherein the storage component is a persistent storage component.

* * * * *